United States Patent [19]

Lin

[11] Patent Number: 5,078,234
[45] Date of Patent: Jan. 7, 1992

[54] OIL BASIN FOR ELECTRIC DISCHARGE MACHINE

[76] Inventor: Tung-Han Lin, No. 39, Chung Cheng N. Rd., Yung Kang Hsiang, Tainan Hsien, Taiwan

[21] Appl. No.: 617,159

[22] Filed: Nov. 23, 1990

[51] Int. Cl.$^5$ .............................................. F16N 31/00
[52] U.S. Cl. .................................... 184/106; 220/660; 219/69.14; 269/15; 422/186.21
[58] Field of Search .................... 184/106, 6; 220/660, 220/4.12, 334, 337, 342, 85.5, 571; 361/382, 385, 381, 364; 137/590; 422/186.21; 269/8, 15; 219/69.11, 69.14

[56] References Cited

U.S. PATENT DOCUMENTS

| | | | |
|---|---|---|---|
| 1,440,473 | 1/1923 | Lapham | 220/334 |
| 2,173,610 | 9/1939 | Haven | 220/334 |
| 3,878,352 | 4/1975 | Inoue | 219/69.14 |
| 4,469,239 | 9/1984 | Gallery | 220/337 |
| 4,892,225 | 1/1990 | Zelewski | 220/337 |

FOREIGN PATENT DOCUMENTS 1-6328  1/1989  Japan .................... 219/69.11

OTHER PUBLICATIONS

Japax-EDM, "Electrical Discharge Machine", 09/1972, pp. 8-13.
Japax, "DP 275A EDM Machine", 08/1973.

Primary Examiner—Ira S. Lazarus
Assistant Examiner—Alan B. Cariaso
Attorney, Agent, or Firm—Bacon & Thomas

[57] ABSTRACT

An improved oil basin for electric discharge machining device has a slanted bottom surface, a 'L' shaped fixed wall at two sides of the basin, two oil outlets at the bottom portions of one side of the fixed wall, and two oil inlets at opposite side from the oil outlets. The basin further has two openable walls with one side of each pivotally hinged to respective sides of the fixed wall. Two slanted gutters are located at inner bottom ends of the two walls to collect oil draining from the inside of the two openable walls. The opposite position arrangement of the oil inlets and outlets provides a better circulation of oil flow so as to strain out all dirt and residue from the oil in order to maintain a good processing quality. The gutters collect oil remaining on the inner side of the two openable walls to prevent oil from dripping to the ground.

6 Claims, 5 Drawing Sheets

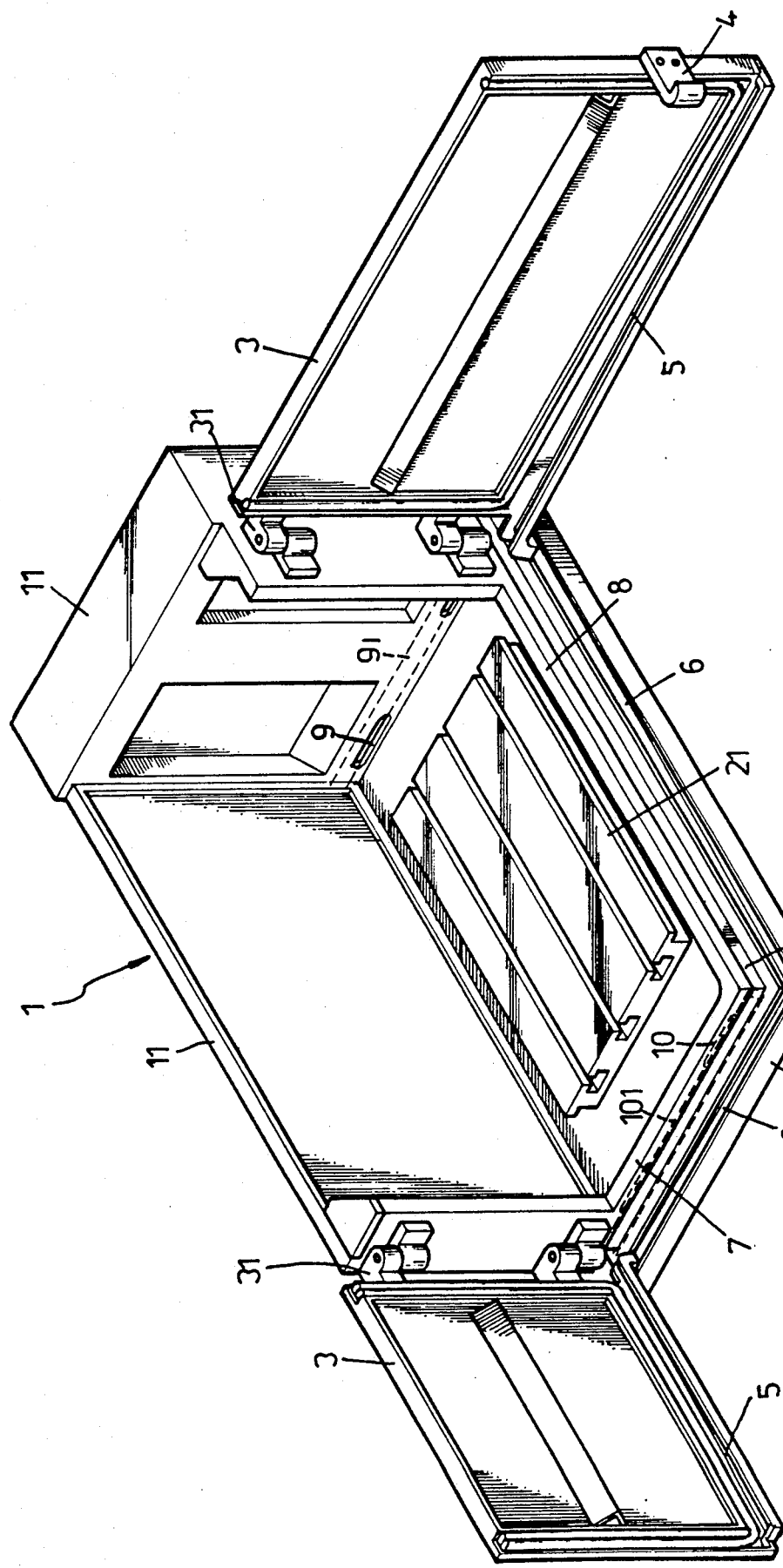

OIL BASIN FOR ELECTRIC DISCHARGE MACHINE

FIELD OF INVENTION

An improved oil basin for an electric discharge machine has a slanted surface and includes a 'L' shaped fixed wall extending upwardly from two edges. Two openable doors are pivotally hinged to respective sides of the L-shaped fixed wall. A magnetic worktable is slidably mounted on the slanted surface.

When a workpiece is attached to the worktable, the worktable may be moved in accordance with a predetermined routine so as to produce a required finishing on the workpiece. The head of an electric discharge machine is set a fixed place and will discharge electricity on the workpiece so as to finish the workpiece. Processing oil is pumped into the basin from inlets at a lower portion of one side of the basin to submerge the workpiece in oil in order to isolate the workpiece from conducting electricity. The finishing machining work produces quite a few particles which are mixed with the processing oil, which is pumped out of the basin during and after the machining work from outlets at a lower portion in the fixed wall to strain out the particles. The cleaned oil is reinjected into the basin to form a flow circulation.

BACKGROUND OF THE INVENTION

As illustrated in FIG. 4, the prior art oil basin for electric discharge machine generally has two movable walls and L-shaped fixed walls to form an oil basin which has a magnetic worktable placed inside. The two movable walls are initially open to place a workpiece on the worktable. The two walls are then closed and oil is injected through the bottom of the oil basin from the inlet into the basin so as to cover the top of the workpiece. In processing, oil is drained out from the outlet which is located in the same side as the inlet. Residue is filtered out and the oil is reinjected into the basin.

However, there are some apparent defects which exist in the above mentioned oil basin. For instance:

1. The oil, after processing, will from the inner sides of the two movable walls onto the floor when the doors are open.

2. The oil, in processing, is drained out of the basin from the same side as it enters rendering it difficult to filter out all the residue which may cause swirl, produce short circuits, or produce a rough surface on the workpiece.

SUMMARY OF THE INVENTION

It is a primary object of the present invention to provide an improved oil basin for an electric discharge machine which utilizes oil drainage gutters having slanting surfaces at the bottom to guide all oil and residue toward a drain outlet.

It is a further object of the present invention to provide an improved oil basin for an electric discharge machine which injects oil from one side and drains the oil from an opposite side for easy draining of the dirty oil and residue.

It is an object of the present invention to provide an improved oil basin for an electric discharge machine which has a gutter at the bottom of each of the two movable walls to prevent oil from dripping down onto the floor when the doors are open.

BRIEF DESCRIPTION OF THE DRAWINGS

FIG. 2a is a perspective view of the apparatus of FIG. 1 with two movable walls in open positions;

FIG. 2b is a partial, side cross-sectional view of the bottom of the apparatus shown in FIG. 2a;

FIG. 3b is an enlarged view of oil dripping portion of portion A shown in FIG. 3a.

DETAILED DESCRIPTION OF THE PREFERRED EMBODIMENT

Figure 1:
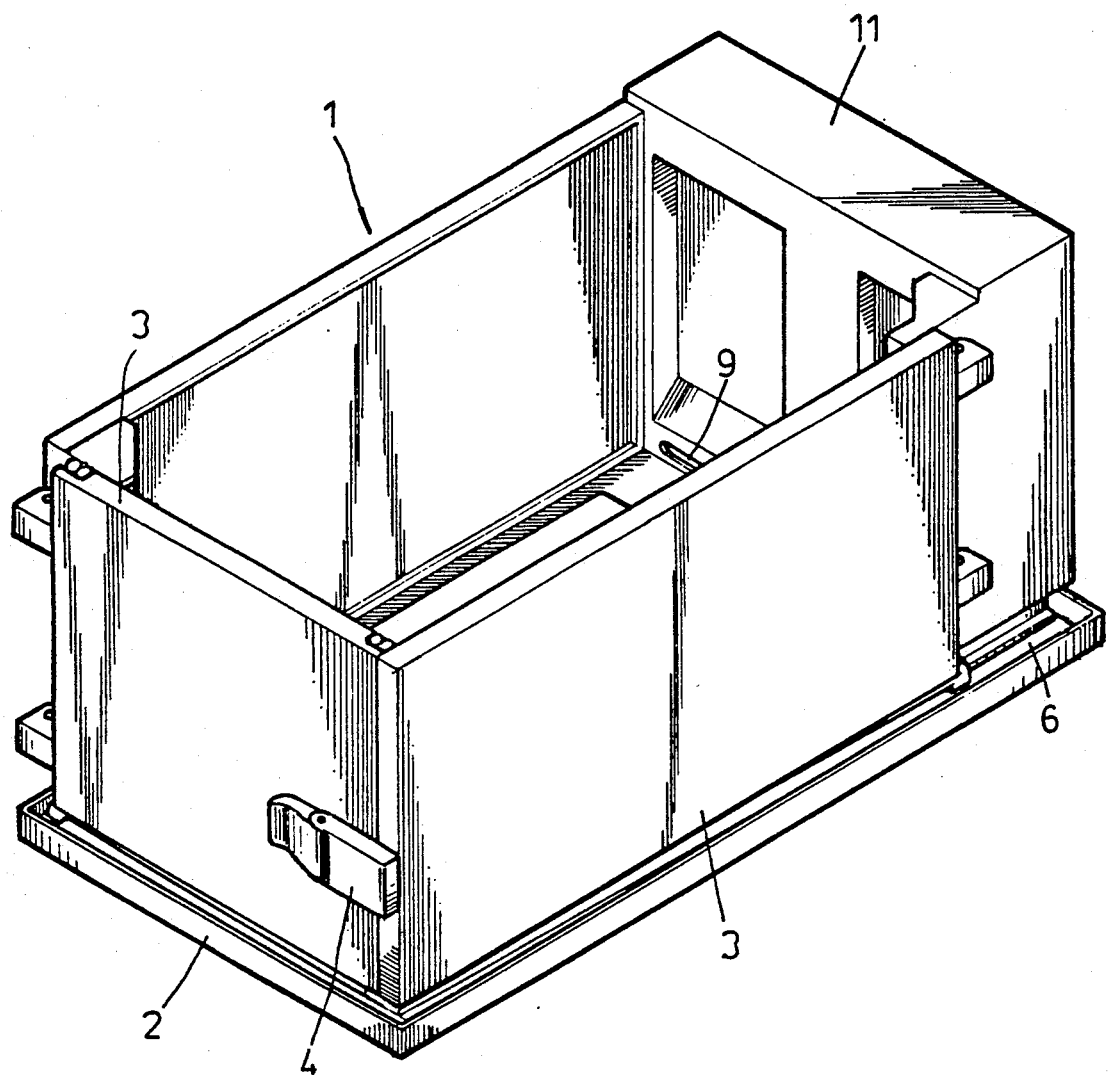
FIG. 1 is a perspective view of the present invention with the movable walls in closed positions.
Figure 2B:
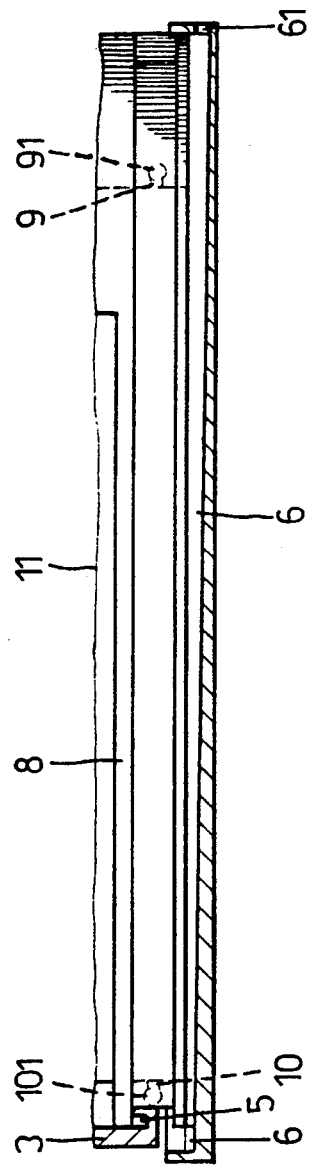

Reference is now made to the drawings in particular to FIGS. 1 and 2a. The oil basin 1 of the present invention comprises a L-shaped fixed wall 11, two movable walls 3 connected with two ends of the fixed wall 11 by means of hinges 31, a lock mechanism 4 that is placed on adjacent two sides of the movable walls 3, and a base frame 2 forming the bottom of the basin 1 and having an inclined surface from one side toward the other. A magnetic worktable 21 is located on the base frame 2 inside the oil basin 1. Protruding edges 7 and 8 are connected with the fixed wall 11 for security engagement with the bottom portions of the two movable walls 3. Concavities 71 are formed by the protruding edges 7 and 8 to receive two oil drainage gutters 5 located on the two movable walls 3 when they are closed. The oil drainage gutters 5 are connected with the bottom portions of the two movable walls 3 and are downwardly inclined from the unconstrained sides of two movable walls 3 toward the base frame. The oil drainage gutters 5 have exits 51 (shown in FIG. 3a and 3b) to guide the oil into the drainage gutter 6 located on the base frame 2. The oil drainage gutter 6 is formed outside the protruding edges 7 and 8 and also is inclined at an angle from one end toward an oil outlet 61 (see FIG. 2b). The oil inlets 10 are located in the protruding edge 7 and permit injection of the oil into the basin 1 by the pipe 101 connected with an oil pump (not shown). Oil outlets 9 are located opposite the oil inlets 10 and are connected to the outlet pipe 91. The outlet pipe 91, the oil drainage outlet 61 and the exit 51 must be in the lowest side of the inclined surfaces for easy draining.

When using the apparatus, two movable walls 3 were closed by the lock mechanism 4, the workpiece is placed on the magnetic worktable 21, and the oil is injected into the oil basin 1 from the inlets 10 until it covers the top of the workpiece. As the machine performs its work, the oil is constantly injected into the oil basin 1 from the inlets 10 and drained out through the outlets 9 to a filter (not shown), an oil pump (not shown), an oil tank (not shown) and through its inlets 10 again. Because of the inclined surface of bottom of the basin 1 and the opposite relation of inlets 10 and outlets 9, the dirty oil and residue can be thoroughly drained out.

Figure 3A:
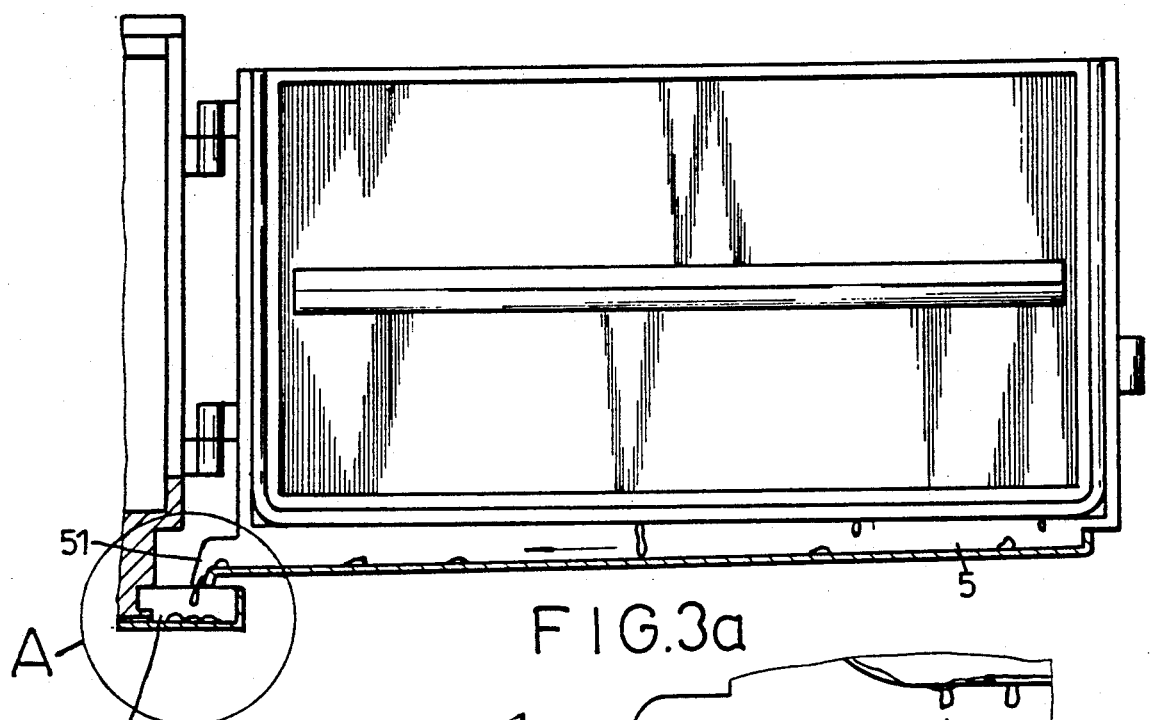
FIG. 3a is a partial end view of the apparatus with a movable wall open and oil dripping from the wall into a slanting gutter.
Figure 3B:
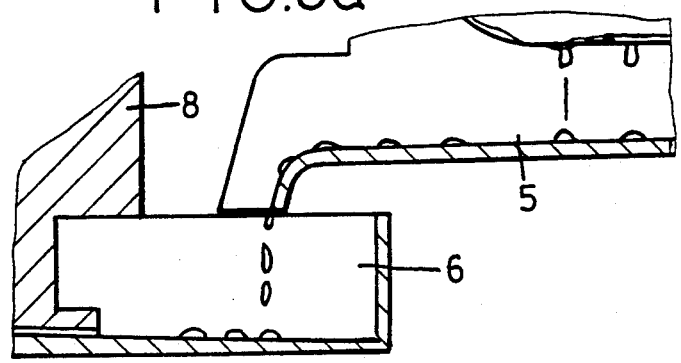
Figure 4:
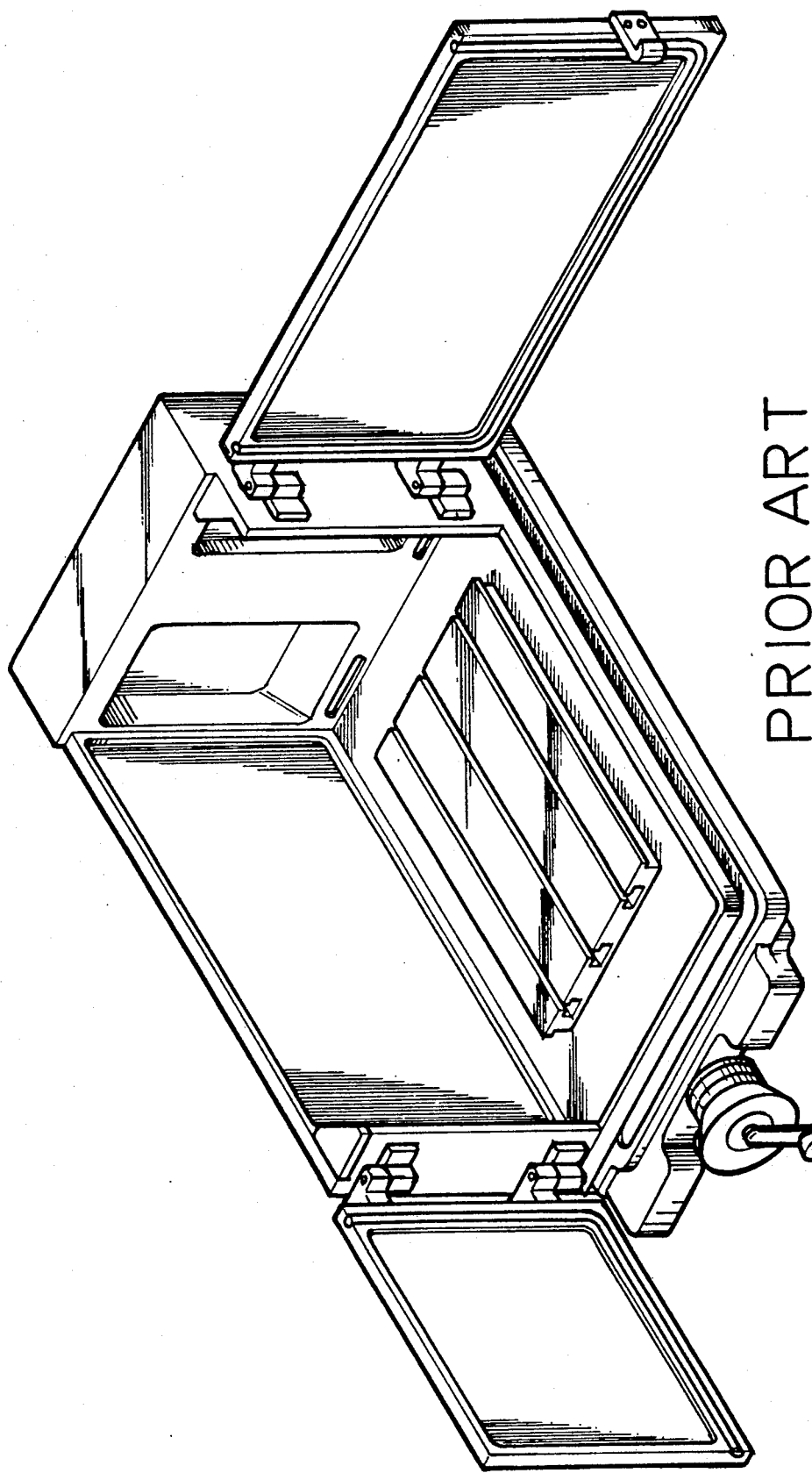
FIG. 4 is a perspective view of an oil basin according to the prior art.

After completion of the machining, all oil in basin 1 is drained out through the outlets 9 and stored in an oil tank. As illustrated in FIGS. 3a and 3b, when the movable walls 3 are opened, the oil adhered on their inner sides will drain into the two gutters 5. Because of the inclined angle of two gutters 5, the oil is guided into the oil drainage gutter 6 by the exit 51 formed on the ends of the gutters 5. Lastly, the oil in the oil drainage gutter will also be drained out through the outlet 61 and flow to the tank (not shown).

While there has been described and illustrated one specific embodiment of the invention, it will be clear that variations in the details of the embodiment specifically illustrated and described may be made without departing from the true spirit and scope of the invention as defined in the appended claims.

I claim:

1. An oil basin for use in electric discharge machining having a base frame, an L-shaped fixed wall extending upwardly from the base frame, first and second movable walls attached to the L-shaped fixed wall, means to latch the movable walls in a closed position to form a work chamber with the L-shaped wall and the base frame and means to supply oil to the work chamber, the oil basin comprising:

a) a first oil drainage gutter formed on the base frame and extending below the first and second movable walls when in their closed positions;
   b) a second oil drainage gutter formed on a lower edge portion of the first movable wall positioned so as to collect oil draining from the wall when it is opened and to direct the collected oil into the first oil drainage gutter; and,
   c) a third oil drainage gutter formed on a lower edge portion of the second movable wall positioned so as to collect oil draining from the wall when it is opened and to direct the collected oil into the first oil drainage gutter.

2. The oil basin of claim 1 wherein the second and third oil drainage gutters are slated downwardly toward the first oil drainage gutter such that gravity causes the oil to flow toward and into the first oil drainage gutter.

3. The oil basin of claim 1 wherein the first oil drainage gutter communicate with an oil drainage outlet.

4. The oil basin of claim 3 wherein the first oil drainage gutter is slanted downwardly from the horizontal such that gravity causes the collected oil to flow toward the oil drainage outlet.

5. The oil basin of claim 1 wherein the base frame defines oil inlets on a first side of the base frame and oil outlets on a second side of the base frame opposite the first side to allow oil to enter and be drained from the work chamber.

6. The oil basin of claim 5 wherein the oil outlets are located at a lower horizontal level than the oil inlets.

* * * * *